United States Patent [19]

Frid et al.

[11] Patent Number: 6,137,791

[45] Date of Patent: *Oct. 24, 2000

[54] COMMUNICATING PACKET DATA WITH A MOBILE STATION ROAMING WITHIN AN INCOMPATIBLE MOBILE NETWORK

[76] Inventors: Lars Frid, Halsingegatan 3, 113 23 Stockholm; Arne Pehrsson, Hasselstigen 10, 141 71 Huddinge; Martin Bäckström, Poppelvägen 14, 141 41 Huddinge; Dick Andersson, Kastrupgatan 3, 164 41 Kista; Ulf Axelsson, Travarvägen 64, 175 39 Järfälla; Ulf Olsson, Grindgårdsvägen 15, 192 77 Sollentuna, all of Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,029

[22] Filed: Mar. 25, 1997

[51] Int. Cl.$^7$ ............................... H04Q 7/00; H04Q 7/20; H04L 12/56

[52] U.S. Cl. .......................... 370/352; 370/331; 455/432; 455/435

[58] Field of Search ..................................... 370/400, 401, 370/402, 351, 352, 353, 355, 356, 312, 313, 328, 329, 331, 332; 455/432, 433, 435, 445; 379/220, 221

[56] References Cited

U.S. PATENT DOCUMENTS

| | | | |
|---|---|---|---|
| H1641 | 4/1997 | Sharman | 455/33.1 |
| 5,533,019 | 7/1996 | Jayapalan | 455/33.1 |
| 5,572,528 | 11/1996 | Shuen | 370/402 |
| 5,590,126 | 12/1996 | Mishra et al. | 370/329 |
| 5,590,133 | 12/1996 | Billstrom et al. | 370/332 |
| 5,659,544 | 8/1997 | La Porta et al. | 455/433 |
| 5,793,762 | 8/1998 | Penners et al. | 370/352 |
| 5,862,345 | 1/1999 | Okanoue et al. | 455/432 |
| 5,896,369 | 4/1999 | Warsa et al. | 370/338 |
| 5,901,142 | 5/1999 | Averbuch | 370/329 |
| 5,901,352 | 5/1999 | St-Pierre et al. | 455/435 |
| 5,912,878 | 6/1999 | Park et al. | 455/427 |

FOREIGN PATENT DOCUMENTS

| | | | |
|---|---|---|---|
| 0642283 | 3/1995 | European Pat. Off. | H04Q 7/22 |
| 9621984 | 7/1996 | WIPO | H04L 12/56 |
| 9704611 | 2/1997 | WIPO | H04Q 7/24 |

OTHER PUBLICATIONS

William Woo, Handoff Enhancement in Mobile–IP environment, IEEE, pp. 760–764, Apr. 1996.

Pierre Dupont, CDPD and Emerging DCS, IEEE, pp. 2–8, Sep. 1996.

C. Perkins, Editor, Network Working Group Memo RFC2002, "IP Mobility Support", IBM (Oct. 1996), pp. 1–56.

Digest of Papers of Compcon (Computer Society Conference) 1996, Technologies for the Information Superhighway, *Wireless Network Extension Using Mobile IP;* Santa Clara, CA, Feb. 1996; R. L. Geiger et al., XP000628459.

Computer Networks and ISDN Systems 27, vol. 2; *IMHP: A Mobile Host Protocol for the Internet;* C. Perkins et al.; Jan. 1994; pp. 479–491, XP000560108.

1993 43rd IEEE Vehicular Technology Conference, USA, *Network and Signaling Structure Based on Personal Digital Cellular Telecommunication System Concept;* USA, May 1993; Hideo Takamura et al., pp. 922–926; XP000393331.

*Primary Examiner*—Chi H. Pham
*Assistant Examiner*—Steven Nguyen
*Attorney, Agent, or Firm*—Jenkens & Gilchrist, A Professional Corporation

[57] ABSTRACT

A roaming mechanism enabling a mobile station to roam between a first data packet network utilizing a Mobile IP Method (MIM) and a second data packet network utilizing a Personal Digital Cellular Mobility Method (PMM) is disclosed. A foreign agent (FA) is introduced into the PMM network for enabling a mobile station associated with the MIM network and currently roaming within the PMM network to communicate packet data with an associated home agent (HA). A home agent (HA) is further introduced into the PMM network for enabling a mobile station associated with the PMM network and currently roaming within the MIM network to communicate packet data with an associated FA or Mobile IP Client Emulator (MICE) currently serving the roaming mobile station.

17 Claims, 10 Drawing Sheets

COMMUNICATING PACKET DATA WITH A MOBILE STATION ROAMING WITHIN AN INCOMPATIBLE MOBILE NETWORK

BACKGROUND OF THE INVENTION

1. Technical Field of the Invention

The present invention relates to packet data communication and, in particular, to the communication of packet data, such as an Internet Protocol (IP) packet, toward a mobile station roaming within an incompatible mobile network.

2. Description of Related Art

Developments and improvements in mobile telecommunications networks have enable mobile subscribers to communicate data, other than mere voice data, over a serving mobile telecommunications network. With a wide proliferation of Internet and e-mail applications, mobile subscribers are able to access their e-mail messages or even browse or "surf" the Internet via their associated mobile stations. Accordingly, a mobile station may function as data terminal equipment (DTE) in providing Internet access or packet communication to an associated mobile subscriber.

Unlike voice communication, packet communication towards mobile stations has not yet been fully standardized. As a result, a number of different standards, protocols, and/or schemes are available to provide packet communication with a mobile station. Such differences in standards are especially true with respect to maintaining a particular mobile station's current location and its registration status. A method and/or scheme for maintaining data associated with a particular mobile station and its location is referred to as "mobility management" and is needed for enabling a mobile station to freely travel or roam within a particular network.

As an illustration, one such standard requires a separate mobility management infrastructure and routing scheme for effectuating packet communication with a mobile station. Such a standard only utilizes a serving mobile switching center (MSC) and base station (BS) associated with an existing mobile telecommunications network for establishing an over-the-air interface with the mobile station located within a particular geographic area. Accordingly, serving mobile telecommunications nodes and devices, such as an MSC and BS, are only utilized for the very last leg of the packet communication link with a mobile station. Such a standard is referred to as a Mobile IP Method (MIM) where a mobile station is assigned with a packet data network independent Internet Protocol (IP) address. The mobility management (MM) for keeping track of the current location of a mobile station and for effectuating packet communication therewith are further performed by separate packet data communications nodes, such as a home agent (HA) and foreign agent (FA).

Another standard for communicating packet data utilizes existing mobile telecommunications nodes and devices for effectuating mobility management associated with a particular mobile station. A home location register (HLR) is utilized within a conventional mobile telecommunications network for maintaining subscription data and for keeping track of a particular mobile station having a subscription therewith. Accordingly, each time a mobile station travels into a geographic area being served by a new MSC, the new MSC communicates with the associated HLR to inform the HLR of the mobile station's new location and to retrieve requisite subscriber data associated with the newly registering mobile station. When an incoming voice call connection is requested toward the mobile station, the serving mobile telecommunications network interrogates the HLR to retrieve the location data previously provided by the serving MSC. Such data are then utilized by a serving Gateway Mobile Switching Center (GMSC), for example, to reroute the received voice call connection to the serving MSC.

Similarly for packet data communication, the existing HLR-MSC location update mechanism and data as described above are also utilized by the packet switching network to locate and to reroute packet data to the destination mobile station. Accordingly, in a manner similar to the HLR interrogation performed by the serving mobile telecommunications network for routing incoming voice calls, the packet data network similarly communicates with the HLR to identify the MSC currently serving the destination mobile station. A gateway packet mobile switching center (GPMSC), for example, then reroutes packets to a Visited Packet Mobile Switching Center (VPMSC) associated with the identified MSC. The serving MSC and BS associated with the VPMSC then establish a radio link with the destination mobile station to effectuate data packet communication in a conventional manner. Such a standard is commonly referred to as a traditional cellular mobility method. One example of a packet data communications network utilizing such a standard is a Personal Digital Cellular Mobility Method network (PDCMM or more commonly known as PMM network).

Even though there are different types of data packet communications standards, as long as a mobile station roams within a mobile telecommunications network utilizing a compatible packet communications standard, a corresponding mobility management scheme communicates with appropriate devices and nodes to enable the mobile station to access packet communication. However, when a mobile station belonging to a first mobile telecommunications network utilizing a first packet communications standard roams into a second mobile telecommunications network utilizing a second packet communications standard, there is currently no mechanism for enabling the mobile station to access packet data communication while visiting the incompatible second packet telecommunications network. As a result, for packet communication, a mobile station is currently restricted to roam within a compatible mobile telecommunications network.

Accordingly, there is a need for a mechanism to enable a mobile station to roam from a first mobile telecommunications network utilizing a first packet communications standard to a second mobile telecommunications network utilizing a second packet communications standard.

SUMMARY OF THE INVENTION

A system is disclosed for enabling a mobile station associated with a first packet data network to roam within a second packet data network where the data routing mechanisms utilized by the first and second packet data networks are incompatible. To handle the situation where a mobile station associated with a first packet data network utilizing a first mobility management roams into a second packet data network utilizing a second mobility management, a foreign agent is introduced into the second packet data network. The foreign agent connects with a gateway packet mobile switching center (GPMSC) associated with the second packet data network and with a home agent associated with the first packet data network. An Internet Protocol (IP) tunnel is then established between the home agent and the foreign agent enabling the home agent to directly deliver incoming packet data to the serving foreign agent. The GPMSC within the second packet data network further comprises an interface module for communicating with the foreign agent. The GPMSC further comprises a Point-to-Point Protocol (PPP) server for effectuating a PPP connection with the roaming mobile station.

As another embodiment of the present invention, to handle the situation where a mobile station associated with the second packet data network roams into the first packet data network, a home agent is introduced into the second packet data network. The foreign agent currently serving the roaming mobile station then establishes a connection with the home agent and with a visited mobile switching center (VMSC) currently providing radio coverage for the mobile station located within a particular geographic area. More specifically, the foreign agent establishes an IP tunnel with the home agent.

The foreign agent associated with the first packet data network further comprises a serving router for routing packet data communicated with the roaming mobile station. The foreign agent in accordance with the teachings of the present invention also includes a Mobile IP Client Emulator (MICE).

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
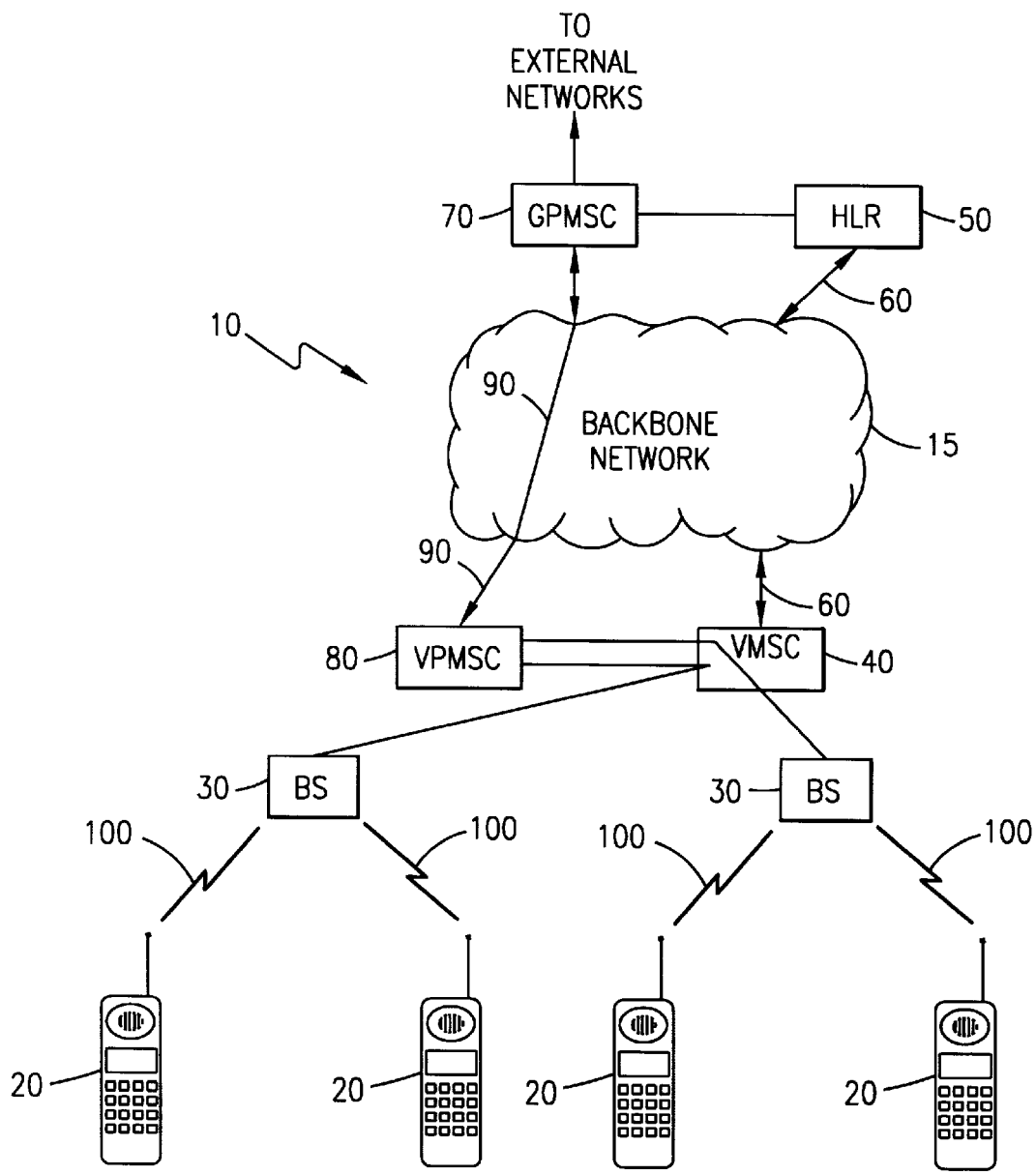
FIG. 1 is a block diagram of a packet data network utilizing a Personal digital cellular Mobility Method (PMM) and illustrating the communication of packet data with a mobile station.

FIG. 1 is a block diagram of a packet data network 10 utilizing a Personal Digital Cellular Mobility Method (PDCMM, hereinafter referred to as a PMM network) and illustrating the communication of packet data with a mobile station 20.

It is in connection with this PMM network that the preferred embodiments of the present invention will be described. However, as the system and method of the present invention are applicable with any network utilizing a traditional cellular mobility method, it will be understood that the description of the present invention in the context of the PMM network provided herein is by way of explanation of the present invention in the context of a packet data network utilizing the traditional cellular mobility method rather than of limitation of the scope of the invention.

A plurality of base stations (BSs) 30 provide radio coverage over a plurality of geographic areas. A particular BS 30 then connects to an associated visited mobile switching center (VMSC) 40 for routing and processing communicated data. In case the communicated data is normal voice data, the VMSC 40 communicates with an associated backbone network 15 to communicate the voice data with a specified destination terminal. On the other hand, in case the communicated data represent Internet Protocol (IP) data or packet data, the VMSC 40 instead communicates with a visited packet mobile switching center (VPMSC) 80. The VPMSC 80 then communicates with the associated backbone network 15 to communicate with a specified destination node.

Whenever a particular mobile station travels into a particular geographic area, a base station (BS) 30 serving that geographic area transmits identification data informing the mobile station of the current location. Utilizing such identification data, the mobile station 20 realizes that it has traveled into a new geographic area being covered by a new visited mobile switching center (VMSC) 40 and performs a registration. Therefore, an associated mobile identification number (MIN, such as a Mobile Subscriber Integrated Service Digital Network—MSISDN number, International Mobile Subscriber Identity—IMSI number, etc.,) is transmitted to the serving base station 30. The serving base station 30, in turn, forwards the received registration request to the VMSC 40 serving that geographic area. Utilizing the received mobile identification number, the VMSC 40 then identifies a home location register (HLR) 50 associated with the mobile station 20. The HLR 50 is a centralized database associated with the home network for storing subscription data representing the mobile station 20 and for maintaining location data reflecting the mobile station's current location and registration status. Furthermore, the HLR SO associated with the PMM network further stores data correlating the received mobile identification number with a corresponding Internet Protocol (IP) address assigned to the mobile station 20.

As a result, a location update signal is transmitted from the serving VMSC 40 to the associated HLR 50 (signal link 60) through the backbone network 15. The HLR 50 authenticates the mobile station 20 and provides requisite subscriber data back to the VMSC 40. The serving VMSC 40 may also be associated with a local database, such as a Gateway Location Register (GLR, not shown in FIG. 1), for storing data associated with all mobile stations currently traveling within its coverage area and for communicating with associated HLRs.

Packet data addressed to the IP address associated with the mobile station 20 is transmitted from an origination point. Such an origination point may be within the same serving PMM network 10 or from an external network. For exemplary purposes, packet data originated towards the mobile station from an external node are illustrated herein. Within the PMM network 10, each associated mobile station 20 is assigned with a PMM network dependent IP address. When packet data addressed to an associated PMM allocated IP address is routed, it is first delivered to a gateway packet mobile switching center (GPMSC) 70 serving the PMM network 10. The GPMSC 70 therefore serves as a gateway for receiving all incoming packet data with IP address associated therewith.

The GPMSC 70 then performs an interrogation with the HLR 50 to determine how to route the received packet data. As described above, the HLR 50 retains information regarding the current location of the mobile station. The GPMSC 70 provides the HLR 50 with the received IP address. Utilizing the received IP address and correlated mobile identification number, the HLR 50 is able to ascertain the current location of the traveling mobile station 20. The HLR 50 then returns routing instructions to the requesting GPMSC 70. Such routing instructions include, for example, an Internet Protocol (IP) address representing a visited packet mobile switching center (VPMSC) 80 associated with the serving VMSC 40. The GPMSC 70, in turn, establishes an IP tunnel 90 with the identified VPMSC 80. The GPMSC 70 effectuates the IP tunnel 90 by encapsulating the received IP packet data addressed to the mobile station 20 within another IP packet addressed to the identified VPMSC 80. The mobile identification number is further encapsulated within the transmitted IP packet. Accordingly, the received packet data is rerouted to the VPMSC 80 associated with the VMSC 40 currently serving the traveling mobile station 20. The VPMSC 80 then extracts the encapsulated original IP packet and identifies the mobile station using the provided mobile station identification number. The extracted IP packet data are then forwarded to the serving VMSC 40 and delivered to the mobile station 20 by way of radio-interface 100. Accordingly, packet data communication with the mobile station 20 is effectuated.

As illustrated, the HLR 50 is interrogated or queried for routing and delivering incoming voice calls as well as packet data within the PMM network. The serving PMM data network 10 therefore utilizes an existing telecommunications node, such as an HLR, to maintain and to locate a particular mobile station for routing packet data thereto. Such an HLR is further utilized for effectuating a handover of a mobile station from a first VMSC to a second VMSC within the PMM network.

For originating packet data communication by the mobile station 20, after performing the location update as described above, the mobile station 20 requests packet data communication to the VPMSC 80 through the serving VMSC 40. The mobile station 20 then originates packet data to the established VPMSC 80 which, in turn, delivers the data to a specified destination node via the connected backbone network 15.

Figure 2:
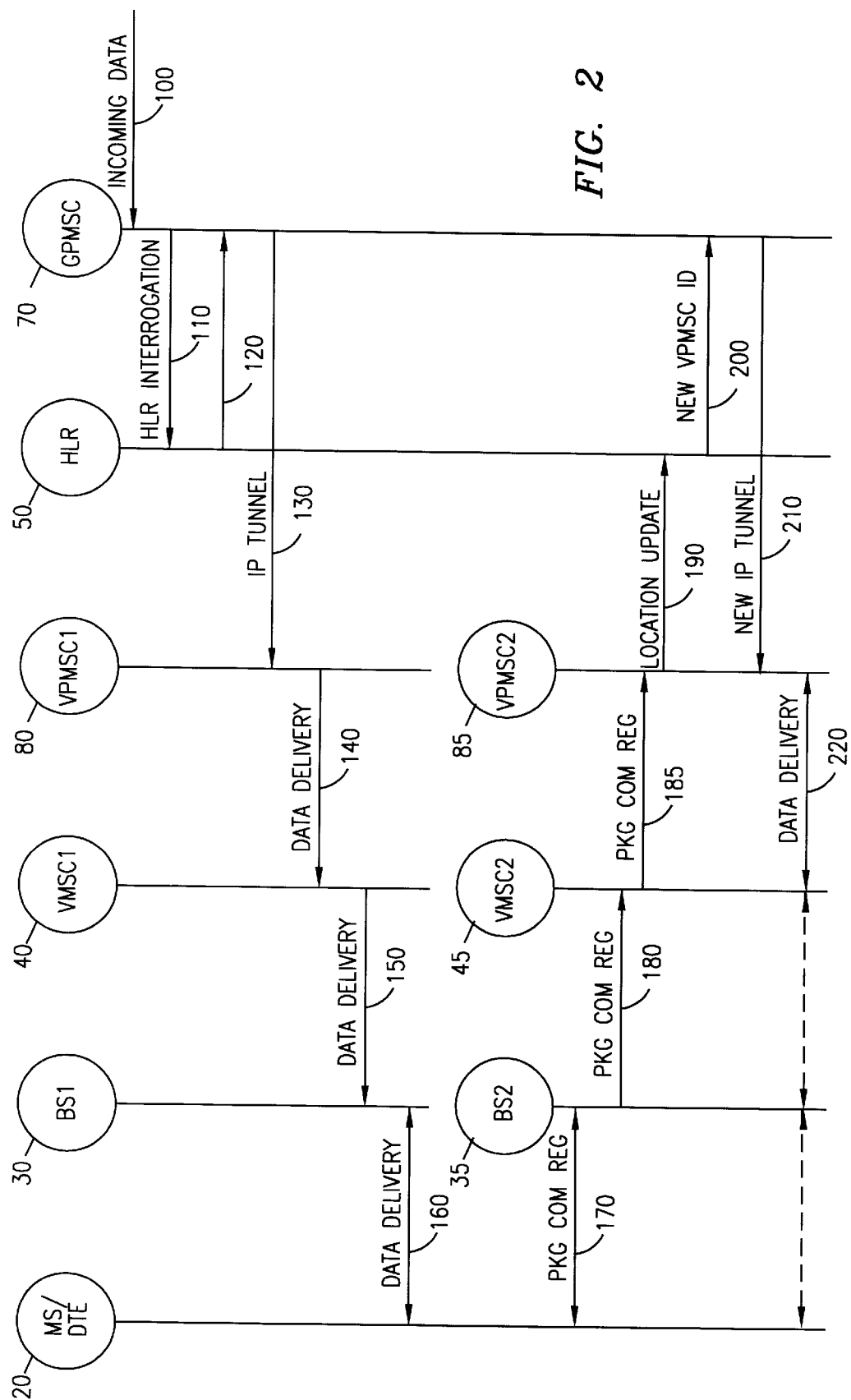
FIG. 2 is a signal sequence diagram illustrating the handover of a mobile station within a network utilizing the Personal digital cellular Mobility Method (PMM)

Reference is now made to FIG. 2 illustrating the handover of a mobile station within the PMM network. A mobile station may also be equipped with or be associated with a data terminal equipment (DTE). As described above, the GPMSC 70 initially receives incoming packet data 100. The GPMSC 70 thereafter performs an HLR interrogation 110 with the associated HLR 50 to acquire routing instructions. The HLR 50 returns an identifying address 120 representing the VPMSC1 80 currently serving the mobile station 20. Alternatively, the serving HLR 50 may also return a roaming number representing the serving VMSC1 40. The GPMSC 70, in turn, may identify the VPMSC1 80 associated with the determined VMSC1 40.

Utilizing the received identifying address, an IP tunnel 130 is then established between the VPMSC1 80 and the GPMSC 70. The VPMSC1 80 then delivers the packet data 140 to the VMSC1 currently serving the mobile station 20. The received packet data are then forwarded 150 to the BS1 30 currently serving that geographic area, such as a cell or location area. By way of radio interface 160, the received packet data are then communicated with the traveling mobile station 20.

When the mobile station 20 travels out of the current geographic area being served by the VMSC1 40 and travels into a new geographic area being served by a new VMSC2 45, the mobile station 20 performs a new location update. A packet communication registration signal 170 is then transmitted to a new BS2 serving the new geographic area. The BS2 then forwards the registration request signal 180 to the connected VMSC2 45. The VMSC 45 then similarly forwards the packet communication registration signal 185 to the associated VPMSC2 85. The VPMSC2 85 then performs a location update 190 with the HLR 50 to inform the HLR 50 of the mobile station's new location. The HLR 50, in turn, informs the GPMSC 70 with a new identifying address 200 representing the new VPMSC 85 associated with the new serving VMSC2. The GPMSC 70 then utilizes the new address to establish a new IP tunnel 210 between the GPMSC 70 and the newly identified VPMSC2 85. Subsequently received data are then rerouted to the new VPMSC2 85 via the new IP tunnel 210. The VPMSC2 85 then delivers the received data 220 to the traveling mobile station 20 in a similar manner as described above. As a result, a hand over of the mobile station from the first VMSC1 40 to the second VMSC 45 is effectuated.

Figure 3:
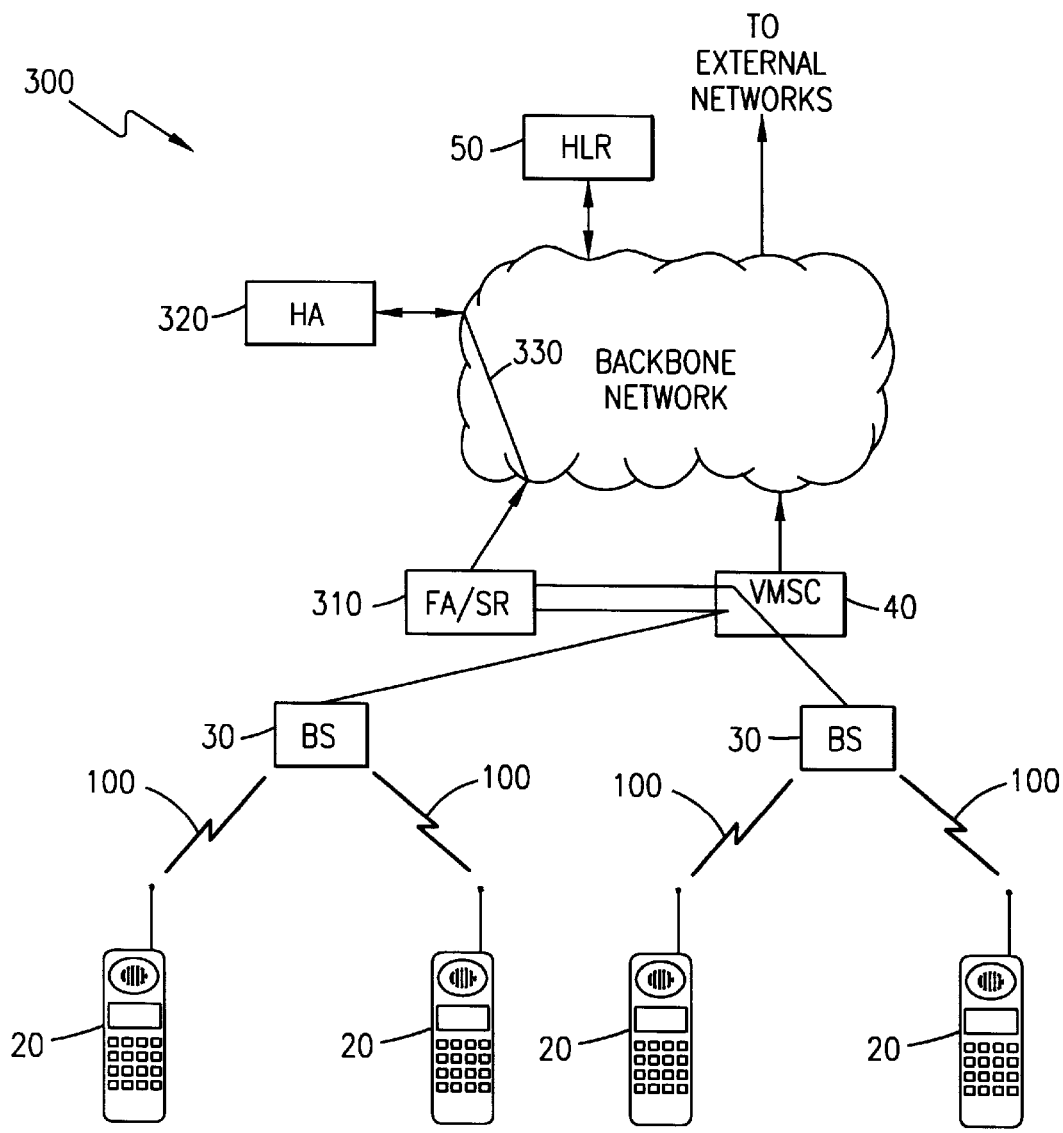
FIG. 3 is a block diagram of a packet data network utilizing a Mobile IP Method (MIM) and illustrating the communication of packet data with a mobile station.

Reference is now made to FIG. 3 illustrating a different type of packet data network 300 utilizing a Mobile IP Method (MIM, hereinafter referred to as an MIM network) to communicate packet data with a mobile station. Within the MIM network 300, packet data communication is effectuated via a home agent (HA) 320 and a foreign agent (FA) 310. Each VMSC 40 or geographic area is associated with a foreign agent (FA) 310 for effectuating packet data communication. Each FA 310 is further equipped with a serving router for routing received packet data to appropriate destination nodes. The mobile station 20 is then associated with a home agent (HA) 320. Furthermore, a mobile station 20 associated with the MIM network 300 is assigned with an IP address representing the associated HA 320. Such a HA can be located either within the MIM network 300 as illustrated in FIG. 3 or within an external network (not shown in FIG. 3) connected to the MIM network. Accordingly, unlike the PMM network, an IP address representing a particular mobile station associated with the MIM network 300 does not necessarily identify the MIM network 300.

Registration of a mobile station within the MIM network is performed in a conventional manner. The mobile station 20 performs a registration request with a BS 30 serving a current geographic area. The BS 30 forwards the request to the connected VMSC 40. The VMSC 40 then performs a location update with an associated HLR 50 to inform the HLR 50 of the mobile station's current location. This location update enables an incoming voice connection to be effectuated towards the traveling mobile station as fully described above.

However, unlike the PMM network, the HLR 50 within the MIM network 300 does not retain data correlating a particular mobile identification number with a corresponding IP address. This is because, as described above, each mobile station within the MIM network 300 is assigned with an MIM network independent IP address. Accordingly, the HLR 50 associated with the MIM network 300 has no control over the associated IP addresses and their correlation with mobile stations.

The serving MIM network itself is not able to initiate a data session with an associated mobile station. As a result, in order to communicate IP packets or data, the serving MIM network needs to wait until the mobile station 20 first initiates a data session. The mobile station 20 initiates a data session by requesting packet data communication with the serving BS 30. The BS 30 then forwards the request through the serving VMSC 40 to an associated foreign agent and serving router (FA/SR) 310. The FA/SR 310 then analyzes the IP address transmitted by the traveling mobile station 20 and determines a home agent 320 associated therewith. The HA 320 is a packet data communication node for keeping track of the mobile station's current location and for performing gateway function for receiving and routing incoming packet data. The FA 310 then communicates with the identified HA 320 to establish an IP tunnel 330 therebetween.

Incoming packet data addressed to the IP address associated with the mobile station 20 are first delivered to the HA 320 associated to the mobile station 20. The HA 320 then reroutes the received packet data to the connected FA/SR 310 by similarly encapsulating the received IP packet within another IP packet addressed to the FA/SR 310. The encapsulated IP packet is then transmitted over the established IP tunnel 330. The FA/SR 310 then extracts the original packet data from the received IP packet and forwards the extracted data through the serving VMSC 40 to the mobile station 20 by way of radio-interface 100 as described above.

As illustrated above, the only mobile telecommunications nodes utilized for effectuating the communication of packet data with a mobile station are the VMSC 40 and base station 30 serving that particular geographic area. Accordingly, the VMSC 40 and BS 30 are used as the very last leg of the communication link to deliver packet data via over-the-air interface 100 toward the mobile station 20. Mobility management (MM) for maintaining the current location of a mobile station 20 and for rerouting packet data to the traveling mobile station 20 are performed via separate packet data communications nodes, such as a home agent (HA) and a foreign agent (FA).

Figure 4:
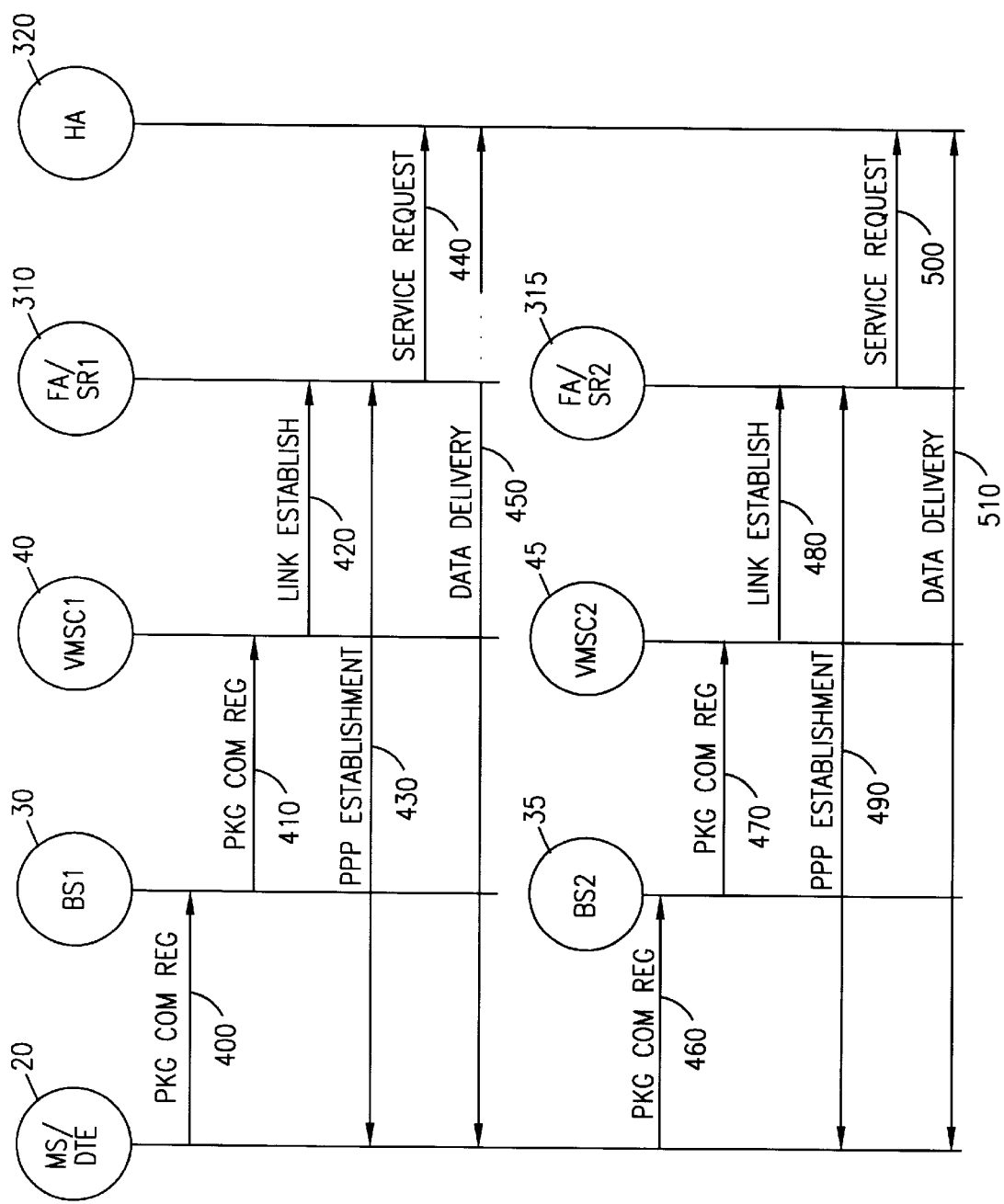
FIG. 4 is a signal sequence diagram illustrating the handover of a mobile station within a network utilizing the Mobile IP Method (MIM)

Reference is now made to FIG. 4 illustrating the handover of a mobile station 20 within an MIM network. As described above, the mobile station 20 traveling within a particular geographic area requests packet communication by transmitting a packet communication request 400 towards the serving BS1 30. The BS1 30 relays the request 410 to the connected VMSC1 40. The VMSC1 40 determines that this request is associated with packet data communication and establishes an IP communication link 420 with the foreign agent/serving router (FA/SR1) 310 serving that particular geographic area. As a result, a Point-to-Point Protocol (PPP) connection is established between the mobile station 20 and the FA/SRI 310. The FA/SRI 310 then communicates with a home agent (HA) 320 associated with the traveling mobile station 20 and effectuates an IP tunnel 440 therebetween. Packet data delivery 450 over the IP tunnel 440 is thereafter effectuated.

When the mobile station 20 travels out of the current geographic area being served by the VMSC1 40 and travels into a new geographic area being served by a new VMSC2 45, the mobile station again requests a new packet communication request 460 to a BS2 35 currently providing radio coverage over the new geographic area. The BS2 35 similarly forwards the request 470 to the VMSC2 45 serving that particular geographic area. The VMSC2 45 then establishes a link with an associated FA/SR2 315. Accordingly, a new PPP connection 480 is established between the mobile station 20 and the new FA/SR2 315. The FA/SR2 315 then contacts the HA 320 associated with the mobile station and establishes a new IP tunnel 500 therebetween. Subsequently received incoming packet data 510 are then delivered to the VMSC2 45 via the new IP tunnel 500. As a result, the mobile station 20 is handed over from the VMSC1 40 and FA/SR1 310 to the new VMSC2 45 and FA/SR2 315.

As illustrated above in FIGS. 1 through 4, mobility management and handover mechanisms within the PMM network and MIM network are different and incompatible with each other. As a result, a mobile station associated with a PMM network is not able to roam into an MIM network and receive packet data therein. Similar incompatibility exists for a mobile station associated with an MIM network and roaming within a PMM network. Furthermore, while maintaining a communication link, the mobile station can not be handed-over over a plurality of VMSCs within a visiting network.

Figure 5:
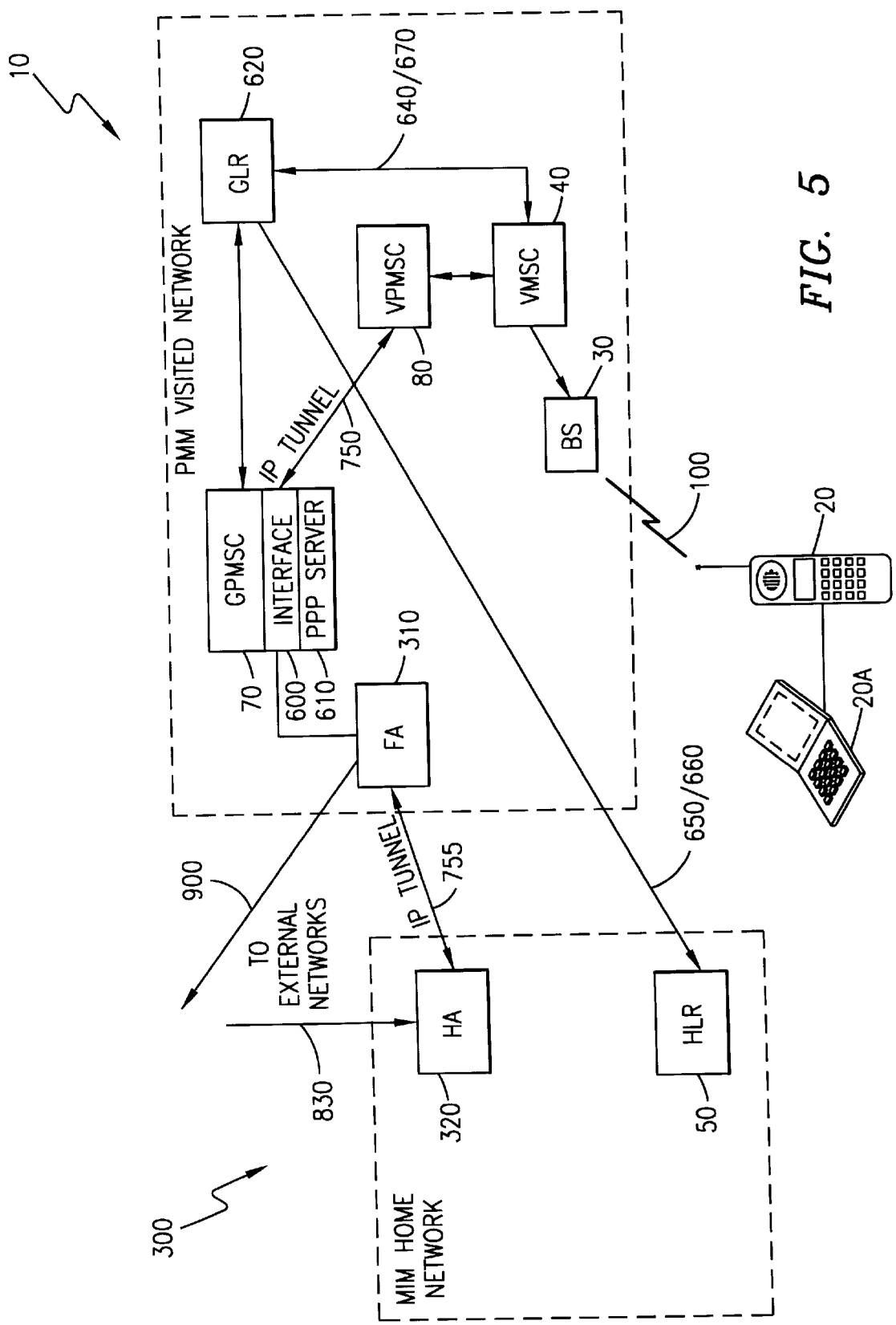
FIG. 5 is a block diagram of two different packet data networks illustrating the roaming of a mobile station from a first packet data network to a second packet data network in accordance with the teachings of the present invention.
Figure 6:
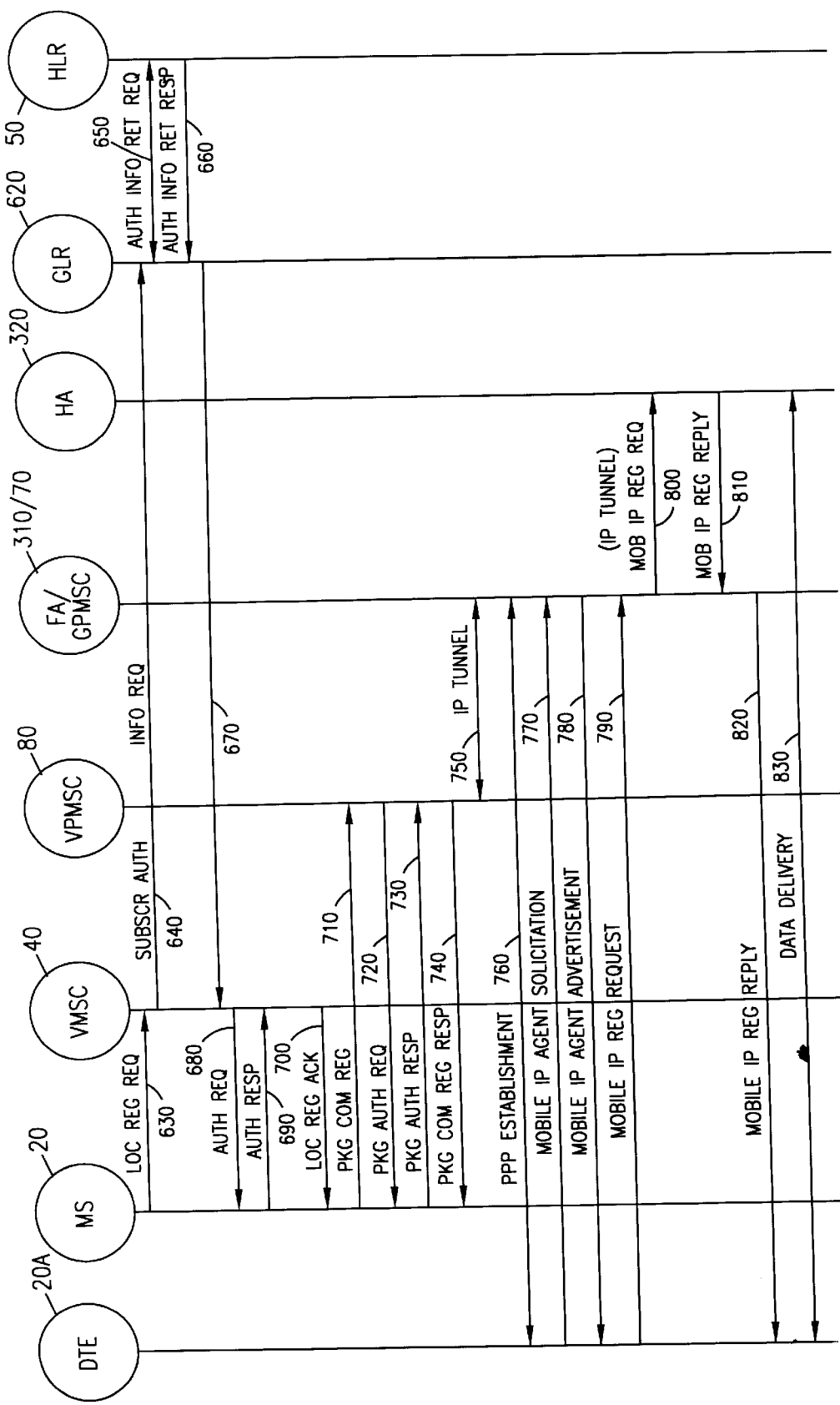
FIG. 6 is a signal sequence chart illustrating the roaming of a mobile station from the first packet data network to the second packet data network.

Reference is now made to both FIGS. 5 and 6 illustrating a mobile station 20 associated with an MIM network 300 roaming within a PMM network 10 in accordance with the teachings of the present invention. The roaming MIM mobile station 20 is associated with a home agent (HA) 320. As previously described, such a HA can be located within the MIM network 300 or within an external data network.

In order to deliver incoming packet data towards the mobile station, the HA 320 needs a corresponding foreign agent (FA) located within the visited geographic area. However, since conventional PMM network 10 does not include a foreign agent, no IP tunnel can be established between the HA 320 and the PMM network 10. Therefore, in accordance with the teachings of the present invention, a foreign agent (FA) 310 is introduced into the PMM network 10 to effectuate an IP tunnel between the home agent (HA) 320 and the PMM network 10.

When the MIM mobile station 20 roams into a new geographic area within the PMM network 10, the mobile station 20 performs a registration in a conventional manner by transmitting a location registration request 630 over the air-interface 100. The mobile station 20 may further be associated with a data terminal equipment (DTE) 20A. The base station (BS) 30 receives the requests and forwards it to the connected VMSC 40. The VMSC 40, in turn, performs an authentication procedure by transmitting a Subscriber Authentication Information Retrieval Request 640 to an associated gateway location register (GLR, also known as a visitor location register VLR) 620. The GLR 620, in turn, transmits an Inter-networking Authentication Information Retrieval Request signal 650 to a home location register (HLR) 50 associated with the registering mobile station 20. The associated HLR 50 authenticates the subscriber and informs the GLR 620 with necessary authentication data via Inter-working Authentication Information Retrieval Response signal 660. Such data include the authentication keys associated with the mobile station 20. The GLR 620, in turn, informs the results 670 back to the requesting VMSC 40. The VMSC 40 then transmits an Authentication Request signal 680 to confirm the authentication data with the mobile station 20. In response, the mobile station 20 provides the requested authentication data via an Authentication Response signal 690. After verifying the received data and confirming the mobile station 20, a Location Registration Acknowledgment signal 700 is transmitted to the mobile station 20 by way of air-interface 100. The mobile station 20 is now registered to access the serving mobile telecommunications network for normal mobile services (i.e., voice call connection).

After establishing the authentication procedure, the associated DTE 20A enters packet mode and instructs the mobile station 20 to transmit a Packet Communication Registration Request signal 710 to the VPMSC 80 through the VMSC 40. Such a separate request is necessary to further enable the mobile station 20 to communicate packet data instead of normal voice data. The VPMSC 80 may further communicate with the associated GLR 620 to authenticate the mobile station 20 for packet data communication (not shown in FIGS. 5 and 6). In return, the VPMSC 80 may also transmit a Packet Authentication Request signal 720 to the mobile station 20. The mobile station 20 may then respond with a Packet Authentication Response signal 730. After verifying that the mobile station 20 is authenticated to utilize packet communication, a Packet Communication Registration Response signal 740 is provided back to the mobile station 20. The mobile station 20 then enters packet mode.

For mobile stations belonging to the MIM network 300 and currently traveling within the PMM network 10, the VPMSC 80 establishes an IP tunnel 750 with the newly created FA 310. More specifically, the VPMSC 80 creates a first IP tunnel 750 with a gateway packet mobile switching center (GPMSC) 70 serving the PMM network 10. The GPMSC 70, in turn, interfaces with the FA 310. As described above, since the mobile station 20 is associated with the MIM network 300, a home agent (HA) 320 associated with mobile station 20 receives all incoming packet data addressed towards the mobile station 20 currently roaming within the PMM network. Since the HA 320 requires a foreign agent (FA) to establish an IP tunnel and to communicate received packet data therebetween, the new foreign agent 310 as described above is introduced within the PMM network 10 in accordance with the teachings of the present invention.

The DTE 20A connected to the mobile station 20 then performs a PPP establishment procedure 760 towards the FA/GPMSC 310/70. The DTE then sends a Mobile IP Agent Solicitation message 770 to effectuate an IP connection with the home network. The new FA node 310 of the PMM network 10 responds with an Mobile IP Agent Advertisement message 780. The DTE then sends a Mobile IP Registration Request message 790 to the FA 310. The FA 310 then identifies the HA 320 associated with the roaming mobile station 20 and forwards the message 800 to the identified HA 320. The HA sends a Mobile IP Registration Reply message 810 back to the FA/GPMSC 310/70 and further establishes a second IP tunnel 755 with the serving FA 310. The FA/GPMSC 310/70 then forwards such a message 820 to the DTE 20A. A data delivery between the HA 320 and the DTE 20A is effectuate thereafter. For example, for incoming data packets 830 addressed towards the DTE 20A, the packets are initially received by the HA 320 and routed to the DTE 20A via the second IP tunnel 755 and the first IP tunnel 750. For outgoing data packets 900 originated from the DTE 20A, the packets are first routed by the first IP tunnel 750 towards the FA 310 and then, for example, to an appropriate external network 900.

The GPMSC 70 associated with the PMM network 10 further includes an interface module 600 for interfacing and communicating with the newly introduced FA 310. Furthermore, in order to facilitate the DTE's PPP establishment request, the GPMSC 70 is further equipped with a PPP server 610 in accordance with the teachings of the present invention.

Accordingly, by introducing the foreign agent (FA) 310 within the PMM compatible network 10, the home agent (HA) 320 located with the home MIM network 300 is able to establish an IP tunnel with the new FA 310 and effectuate packet data communication with the mobile station 20 roaming within an otherwise incompatible network.

Figure 7:
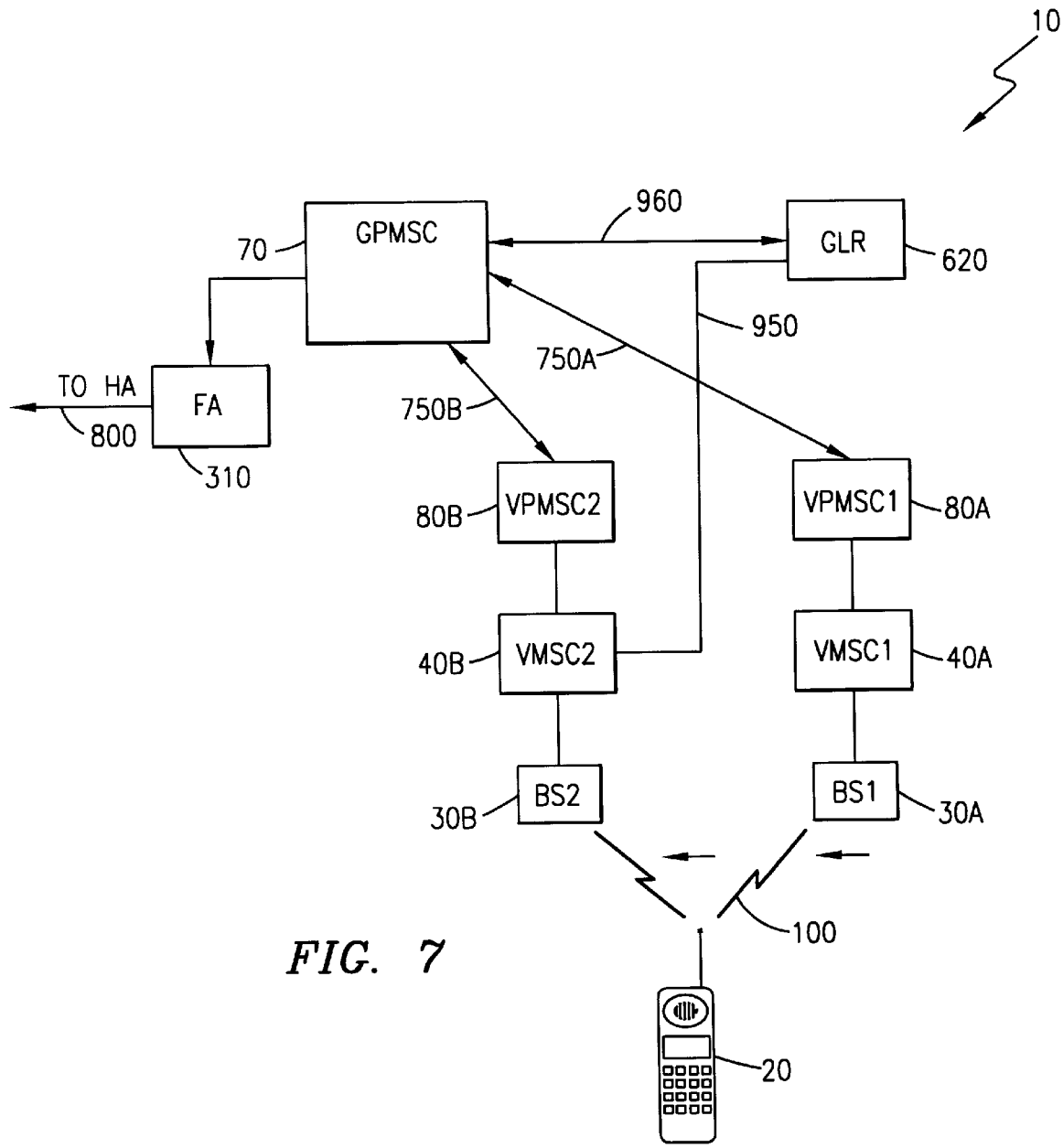
FIG. 7 is a block diagram of the second packet data network illustrating the handover of the mobile station associated with the first packet data network from a first visited mobile switching center (VMSC) to a second VMSC.

FIG. 7 is a block diagram of the PMM data packet network 10 illustrating the hand over of a mobile station 20 associated with the MIM network from a visited mobile switching center 1 (VMSC1) 40A to a VMSC2 40B in accordance with the teachings of the present invention. As described in detail in FIGS. 5 and 6, the mobile station 20 associated with the MIM network roams into the PMM network 10 and is being served by the VMSC1 40A. An IP tunnel 750A is established between a visited packet mobile switching center 1 (VPMSC) 80A associated with the serving VMSC1 40A and the gateway packet mobile switching center (GPMSC) 70 as described above. The GPMSC 70 then interfaces with a foreign agent (FA) 310 for communicating packet data with an associated home agent (HA) over yet another IP tunnel 800. When the mobile station 20 travels out of the current VMSC1 coverage area and roams into a new geographic area being covered by the VMSC2 40B, the mobile station 20 again performs a location update 100 in a similar manner. A base station 2 (BS2) 30B providing radio coverage for that particular geographic area then receives the location update signal and forwards it to the associated VMSC2 40B. The VMSC2 40B then communicates with the GLR 620 to authenticate the new mobile station 20 and to inform the GLR 620 of the mobile station's new location (signal 940). The GLR 620, realizing that this mobile station is roaming from the VMSC1 coverage area to the VMSC2 coverage area and needs to be handed over to the VMSC2, informs the GPMSC 70 accordingly (signal 960). The GPMSC 70, in turn, identifies a new VPMSC2 80B associated with the VMSC2 40B and establishes a new IP tunnel 750B therebetween. The existing IP tunnel 750A between the GPMSC 70 and the previous VPMSC1 80A is released. However, the IP connection 800 between the HA (not shown in FIG. 7, refer to FIG. 5) and the FA 310, and a connection between the FA 310 and the GPMSC 70 remain unchanged. As a result, subsequently communicated packet data are effectuated over the newly established IP tunnel 750B and delivered to the mobile station 20 via the new VMSC2 40B. A handover from the first VMSC1 40A to the second VMSC2 40B is successfully performed.

Figure 8:
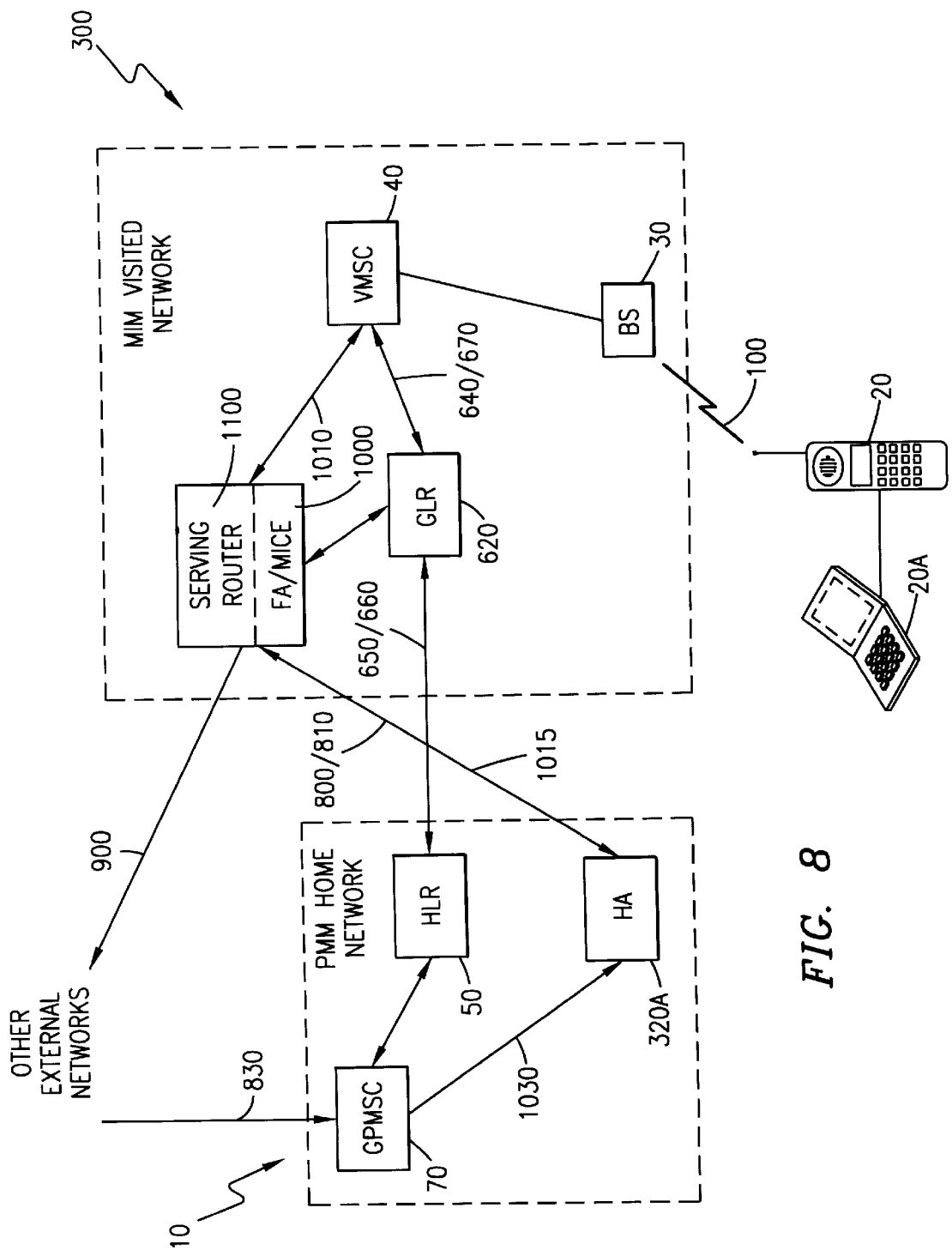
FIG. 8 is a block diagram of two different packet data networks illustrating the roaming of a mobile station from the second packet data network to the first packet data network in accordance with the teachings of the present invention.
Figure 9:
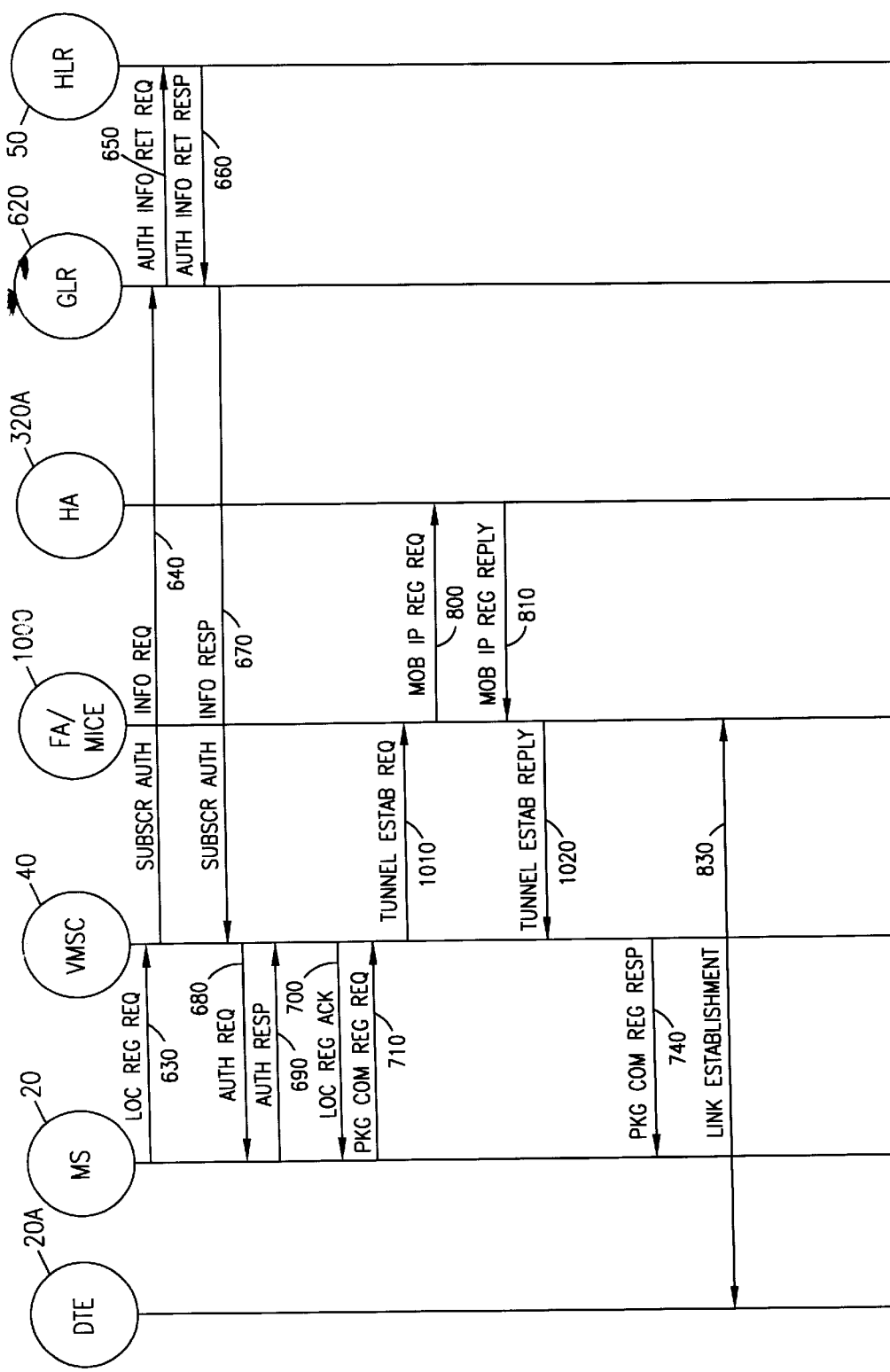
FIG. 9 is a signal sequence chart illustrating the roaming of the mobile station from the second packet data network to the first packet data network.

Reference is now made to both FIGS. 8 and 9 illustrating a mobile station 20 associated with a PMM network 10 roaming into an MIM network 300 in accordance with the teachings of the present invention. As fully described in FIGS. 3 and 4, the MIM network 300 serving the roaming mobile station 20 utilizes a foreign agent (FA, not shown in FIG. 8, refer to FIG. 3) to route packet data with an associated mobile station. The FA then communicates with a home agent (HA) associated with the traveling mobile station and located within the home network to establish an IP tunnel therebetween. However, the PMM network 10 associated with a PMM mobile station 20 does not include a home agent (HA) for serving the roaming mobile station 20. Instead, the PMM network utilizes a GPMSC (not shown, refer to FIG. 1) and an HLR 50 for effectuating mobility management and for receiving incoming packet data addressed to the roaming mobile station. Furthermore, the signaling sequences utilized by the roaming mobile station are incompatible with the MIM network. The MIM network 300 expects the mobile station to perform a Mobile IP Registration before transmitting user data thereto.

However, a standard PMM associated mobile station does not perform such a registration. Therefore, in order to resolve such an incompatibility, in accordance with the teachings of the present invention, a new home agent (HA) 320A is introduced into the PMM network 10 for purposes of serving a PMM network associated mobile station currently roaming within the MIM network 300.

The registration of the mobile station 20 associated with the PMM network and roaming within the MIM network 300 is performed in a conventional manner as fully described above. For example, the mobile station 20 roams into a new geographic area within the MIM network 300 and performs a registration by transmitting a location registration request 630 over the air-interface 100. The base station (BS) 30 receives the request and forwards it to the connected VMSC 40. The VMSC 40, in turn, performs an authentication procedure by transmitting a Subscriber Authentication Information Retrieval Request signal 640 to an associated gateway location register (GLR, also known as a visitor location register VLR) 620. The GLR 620, in turn, transmits an Inter-networking Authentication Information Retrieval Request signal 650 to a home location register (HLR) 50 associated with the registering mobile station 20. The associated HLR 50 authenticates the subscriber and informs the GLR 620 with necessary authentication data via an Inter-working Authentication Information Retrieval Response signal 660. Such data include the authentication keys associated with the mobile station 20. Additional subscription data, such as special subscriber feature data, may further be downloaded to the GLR 620.

The GLR 620, in turn, informs the results 670 back to the requesting VMSC 40. The VMSC 40 then transmits an Authentication Request signal 680 to confirm the authentication data with the mobile station 20. In response, the mobile station 20 provides the requested authentication data via an Authentication Response signal 690. After verifying the received data and confirming the mobile station 20, a Location Registration Acknowledgment signal 700 is transmitted to the mobile station by way of air-interface 100. The mobile station 20 is now registered to receive normal mobile service.

The DTE 20A associated with the mobile station 20 enters packet mode and instructs the mobile station 20 to transmit a Packet Communication Registration Request message 710 over the air-interface 100. Such a separate packet request is necessary because the previously performed registration by itself does not authenticate the mobile station 20 for packet communication. After authenticating the mobile station for packet communication with associated GLR (not shown in FIGS. 8 and 9), the VMSC 40 sends a Packet Authentication Request signal to the requesting mobile station (not shown in FIGS. 8 and 9). The VMSC 40 may also receive Mobile IP parameters from the associated GLR. After confirming the authentication, since the mobile station 20 is a PMM associated mobile station, instead of communicating with a conventional foreign agent (FA), the VMSC 40 transmits a Tunnel Establishment Request 1010 to a newly introduced packet data communication function known as a Mobile IP Client Emulator (MICE) 1000. This function may reside within a service router. The transmitted tunnel request further includes the Mobile IP parameters received from the GLR. The MICE 1000, in turn acting as a foreign agent, sends a Mobile IP Registration Request 800 to the newly introduced HA 320A of the home network, emulating a DTE supporting Mobile IP in accordance with the teachings of the present invention. The retrieved Mobile IP parameters are further communicated during this process. The HA 320A responds with a Mobile IP Registration Reply message 810. As a result, an IP tunnel 1015 between the newly introduced HA 320A associated with the PMM network and the MICE 1000 associated with the MIM network is established. The MICE 100 then transmits a Tunnel Establishment Reply signal 1020 to the VMSC 40. The VMSC 40 then sends a Packet Communication Registration Response signal 740 to the mobile station 20. Upon receiving the acknowledgment signal, the mobile station 20 enters packet mode. The associated DTE 20A then performs a link establishment 830 towards the MICE 1000 in accordance with the pre-defined PMM procedures.

The newly introduced MICE 1000 functions as a foreign agent (FA) for the mobile station 20 associated with the PMM network 10 and traveling within the MIM network 300. Since the IP address associated with the mobile station 20 also represent the home PMM network 10, all incoming packet data addressed toward the mobile station 20 are first received by the gateway packet mobile switching center (GPMSC) 70 located within the home PMM network 10. After communicating with the associated HLR 50, instead of establishing an IP tunnel with a visited packet mobile switching center (VPMSC, refer to FIG. 1), the GPMSC 70 realizes that the mobile station 20 is currently traveling within the MIM network 300 and instead establishes an IP tunnel 1030 with the newly introduced HA 320A. The HA 320A then delivers the received packet data towards the MICE 1000 over the established IP tunnel 1015. The MICE 1000 then extracts the encapsulated packet data and delivers the extracted data to the VMSC 40 currently serving the mobile station 20.

The MICE 1000 is further associated with a serving router 1100. For outgoing packet data originated by the roaming mobile station 20, there is no need for the packet data to be delivered to the home network 10. Instead, the serving router 1100 associated with the MICE 1000 connects to other external networks, if necessary, and transmits the received data packets 900 directly.

Figure 10:
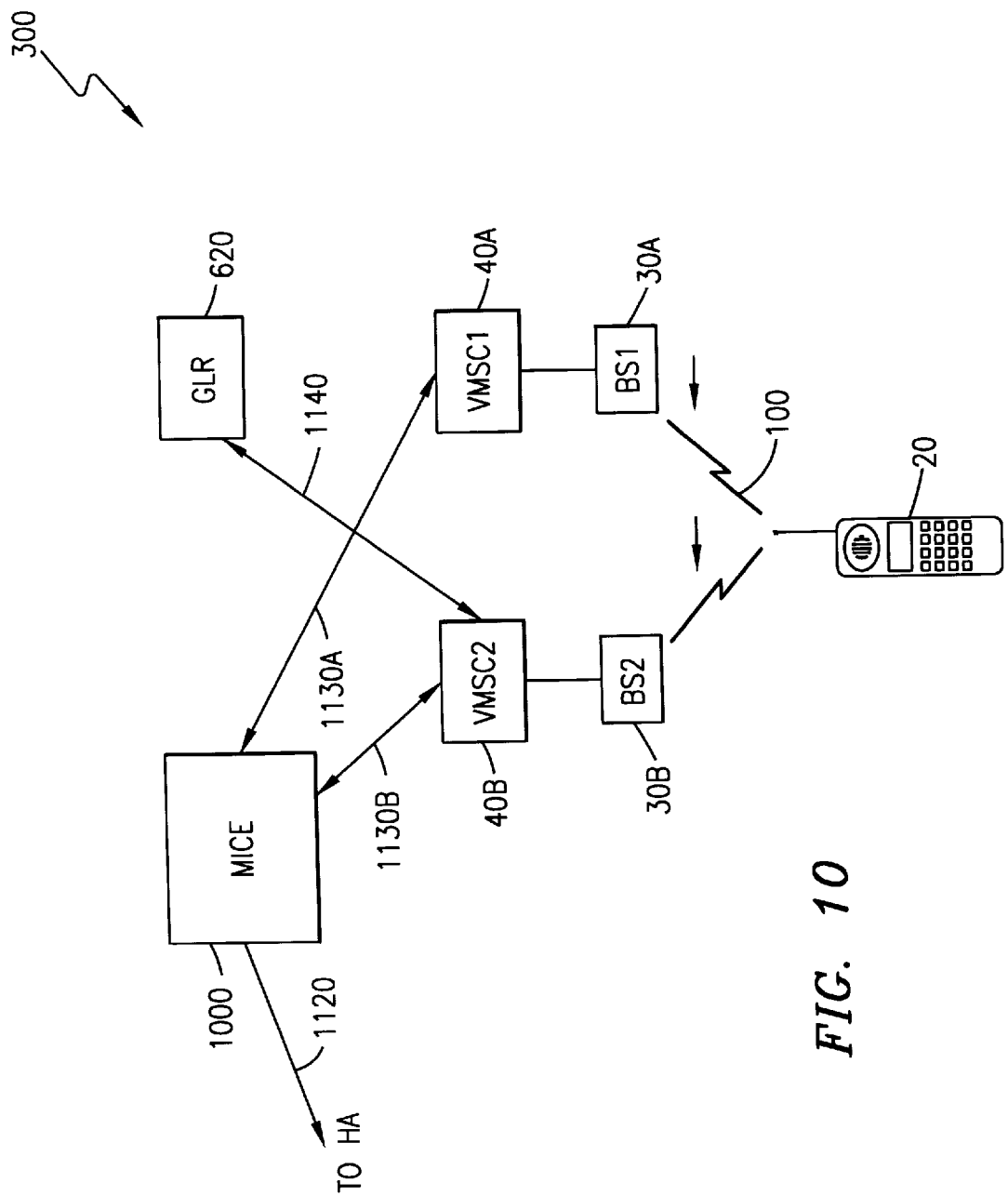
FIG. 10 is a block diagram of the first packet data network illustrating the handover of a mobile station associated with the second packet data network from a first visited mobile switching center (VMSC) to a second VMSC.

FIG. 10 is a block diagram illustrating the hand over of a mobile station associated with a PMM network being handed over from a VMSC1 40A to a VMSC2 40B within a visited MIM network 300 in accordance with the teachings of the present invention. In a manner as described in FIGS. 8 and 9, the mobile station 20 registers with and is being served by the VMSC1 40A. When the mobile station 20 travels out of the VMSC1 coverage area and travels into a new geographic area being served by the new VMSC2 40B, the mobile station 20 again performs a packet communication registration therewith. The transmitted registration signal is received by a new BS2 30B providing radio coverage for that particular geographic area and forwarded to the associated VMSC2 40B. In a conventional manner as described above, the VMSC2 40B then communicates with the GLR 620 to authenticate the mobile station (signal 1140). The GLR 620, realizing that the mobile station 20 is a PMM associated mobile station, accordingly informs the VMSC2 40B. The VMSC2 40B then issues a tunnel establishment request to the MICE 1000. The MICE 1000 then determines that the new VMSC2 40B is attempting to serve the roaming mobile station 20, interrupts the current IP connection 1130A with the existing VMSC1 40A, and establishes a new IP connection 1130B with the new VMSC2 40B. All subsequently received packet data are then delivered to the new VMSC2 40B over the newly established IP connection 1130B. The existing IP tunnel 1120 between the MICE 1100 and the HA remains unchanged. As a result, a handover from the VMSC1 40A to the VMSC2 40B within the MIM network 300 is effectuated.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for enabling a mobile station belonging to a first mobile telecommunications network utilizing a first packet communications standard to roam within a second mobile telecommunications network utilizing a second packet communications standard, said system comprising:

a packet data network capable of forwarding packet data toward said first mobile telecommunications network, wherein said first mobile telecommunications network is incompatible with said second mobile telecommunications network;

said first mobile telecommunications network including a home agent capable of receiving the packet data from said packet data network;

a first IP tunnel located between said first mobile telecommunications network and said second mobile telecommunications network;

said second mobile telecommunications network including:

a foreign agent capable of receiving the packet data from the home agent through said first IP tunnel;

a gateway node capable of receiving the packet data from the foreign agent;

a first visited packet serving node capable of receiving the packet data from the gateway node through a second IP tunnel located between the first visited packet serving node and the gateway node;

a first visited mobile switching center capable of receiving the packet data from the first visited packet serving node; and a base station capable of receiving the packet data from the first visited mobile switching center and further capable of forwarding the packet data to the mobile station, and in case the mobile station travels into a new geographic area being served by a second visited mobile switching center associated with a second visited packet serving node, said gateway node is also capable of establishing a third IP tunnel between said gateway node and said second visited packet serving node and releasing the second IP tunnel between said gateway node and said first visited packet serving node.

2. The system of claim 1 wherein said gateway node comprises a gateway packet mobile switching center (GPMSC).

3. The system of claim 2 wherein said GPMSC further comprises an interface module for connecting said GPMSC with said foreign agent.

4. The system of claim 2 wherein said GPMSC further comprises a Point-to-Point Protocol (PPP) server for establishing PPP connection with said mobile station.

5. The system of claim 1 wherein said connection between said gateway node and said foreign agent is only established for a mobile station associated with said first packet data network and roaming within said second packet data network.

6. The system of claim 1 wherein said first packet communications standard utilizes a Mobile IP Method (MIM), and said second packet communications standard utilizes a Personal Digital Cellular (PDC) Mobility Method (PMM).

7. The system of claim 1 wherein said first IP tunnel enables a communications link where one IP packet is encapsulated within another IP packet.

8. The system of claim 1 wherein said foreign agent within said second mobile telecommunications network is used to communicate outgoing packet data from the mobile station to another external network while bypassing the first mobile telecommunications network.

9. The system of claim 1, wherein said mobile station further includes or is associated with a data terminal equipment, and said first IP tunnel between the home agent within said first mobile telecommunications network and the foreign agent within said second mobile telecommunications network is created by:

sending a mobile IP agent solicitation message from the data terminal equipment to the foreign agent;

sending a mobile IP agent advertisement message from the foreign agent to the data terminal equipment;

sending a mobile IP registration request from the data terminal equipment to the foreign agent;

sending the mobile IP registration request from the foreign agent to the home agent;

sending a mobile IP registration reply message from the home agent to the foreign agent; and sending the mobile IP registration reply message from the foreign agent to the data terminal equipment.

10. A system for enabling a mobile station belonging to a first mobile telecommunications network utilizing a first packet communications standard to roam within a second mobile telecommunications network utilizing a second packet communications standard, said system comprising:

a packet data network capable of forwarding packet data toward said first mobile telecommunications network, wherein said first mobile telecommunications network is incompatible with said second mobile telecommunications network;

said first mobile telecommunications network including a gateway packet mobile switching center capable of receiving the packet data from said packet data network, and further including a home agent capable of receiving the packet data from the gateway packet mobile switching center;

a first IP tunnel located between said first mobile telecommunications network and said second mobile telecommunications network;

said second mobile telecommunications network including:

a foreign agent capable of receiving the packet data from the home agent through said first IP tunnel;

a first visited mobile switching center capable of receiving the packet data from the foreign agent; and a base station capable of receiving the packet data from the first visited mobile switching center and further capable of forwarding the packet data to the mobile station, and in case said mobile station travels into a new geographic area being served by a second mobile switching center, said foreign agent further capable of releasing an interface established between said foreign agent and said first mobile switching center and establishing a new interface between said foreign agent and said second mobile switching center.

11. The system of claim 10 wherein said foreign agent further comprises a serving router for routing packet data communicated with said mobile station.

12. The system of claim 11 wherein said serving router further includes a mobile IP client emulator.

13. The system of claim 12 wherein said mobile IP client emulator within said second mobile telecommunications network is used to communicate outgoing packet data from the mobile station to another external network while bypassing the first mobile telecommunications network.

14. The system of claim 10 wherein said first IP tunnel is used for communicating incoming packet data toward said mobile station and not used for communicating outgoing packet data from said mobile station.

15. The system of claim 10 wherein said first IP tunnel enables a communications link where one IP packet is encapsulated within another IP packet.

16. The system of claim 10 wherein said first packet communications standard utilizes a Personal Digital Cellular (PDC) Mobility Method (PMM), and said second packet communications standard utilizes a Mobile IP Method (MIM).

17. The system of claim 10, wherein said mobile station further includes or is associated with a data terminal equipment, and said first IP tunnel between the home agent within said first mobile telecommunications network and the foreign agent within said second mobile telecommunications network is created by:

sending a tunnel establishment request from the first visited mobile switching center to the foreign agent;

sending a mobile IP registration request from the foreign agent capable of emulating the data terminal equipment to the home agent;

sending a mobile IP registration reply message from the home agent to the foreign agent;

sending a tunnel establishment reply signal from the foreign agent to the first visited mobile switching center;

sending a packet communication registration response signal from the first visited mobile switching center to the data terminal equipment; and establishing a link between the data terminal equipment and the foreign agent.

\* \* \* \* \*

UNITED STATES PATENT AND TRADEMARK OFFICE
CERTIFICATE OF CORRECTION

PATENT NO. : 6,137,791  
DATED : October 24, 2000  
INVENTOR(S) : Frid, et al.

Page 1 of 1

It is certified that error appears in the above-identified patent and that said Letters Patent is hereby corrected as shown below:

Title page,  
Item [73] Assignee, please add: -- Telefonaktiebolaget LM Ericsson (publ), Stockholm, Sweden --

Column 4,  
Line 48, replace "HLR SO" with -- HLR 50 --

Column 7,  
Line 58, replace "FA/SRI 310. The FA/ SRI 310" with -- FA/SR1 310. The FA/SR1 310 --

Signed and Sealed this

Thirtieth Day of October, 2001

Attest:

NICHOLAS P. GODICI  
Attesting Officer    Acting Director of the United States Patent and Trademark Office